UNITED STATES PATENT OFFICE.

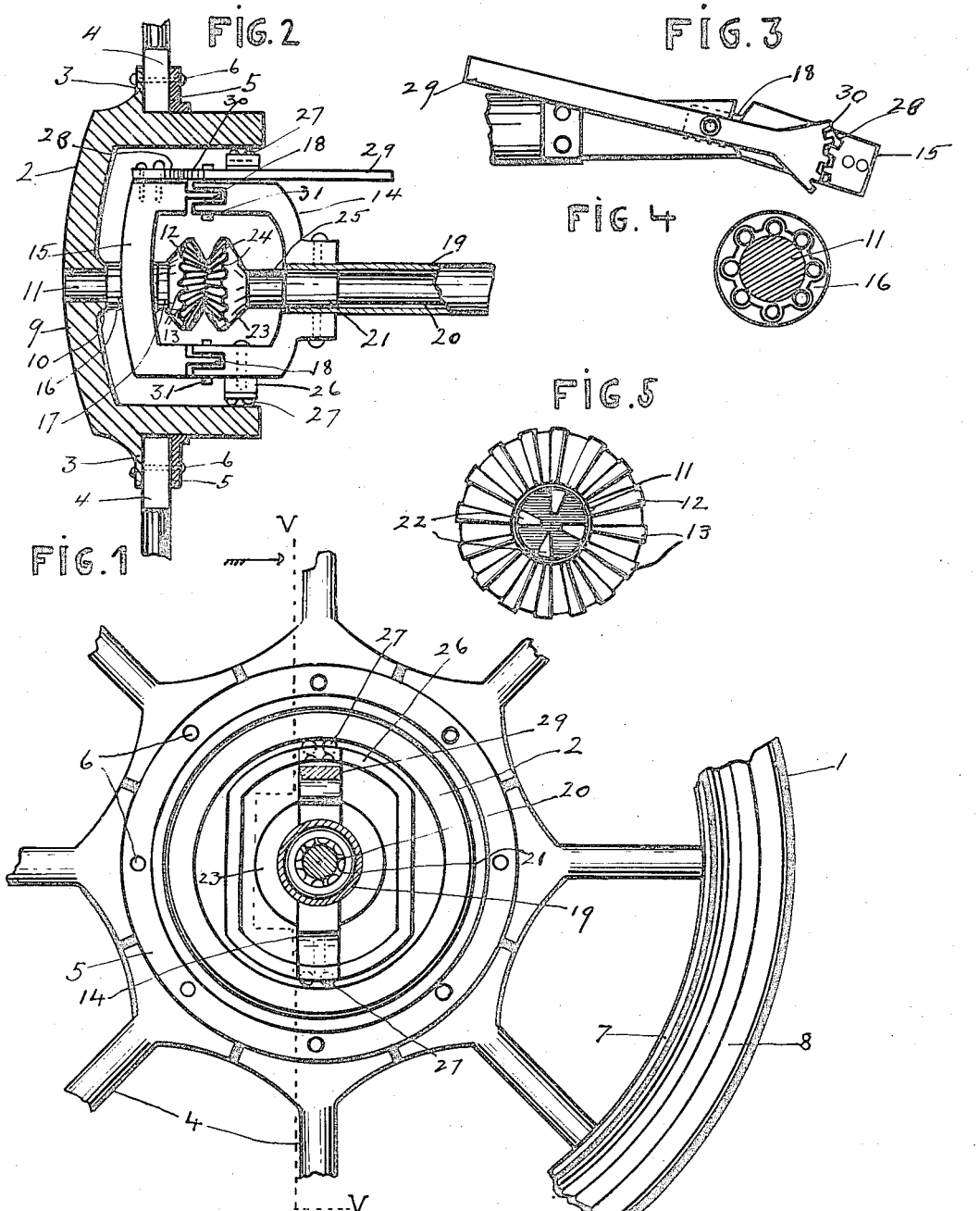

ELI NOEL, OF KANSAS CITY, MISSOURI.

FRONT-WHEEL DRIVE FOR AUTOMOBILES.

1,209,875. Specification of Letters Patent. Patented Dec. 26, 1916.

Application filed February 24, 1916. Serial No. 80,205.

*To all whom it may concern:*

Be it known that I, ELI NOEL, a citizen of the United States, residing at Kansas City, in the county of Jackson and State of Missouri, have invented a new and useful Front-Wheel Drive for Automobiles, of which the following is a specification.

My invention relates to improvement in front wheel drive for automobiles in which the driving and steering mechanism which drives and steers the wheel is operatively mounted in the hub of the wheel.

The objects of my invention are, first, to provide a cheap and durable hub for the wheel which shall house the power receiving and power transmitting devices which drive and steer the wheel; second, to provide within the hub, gear wheels having convex cogs and adapted to operatively engage each other at various angles of contact, one of which revolves with the hub and the other revolves independently of the hub; third, to provide within the hub a divided and hingedly connected supporting frame for the gear wheels; fourth, to provide a rack on the swinging portion of the supporting frame and a pivoted lever on the immovable portion thereof and having cogs adapted to engage the rack to steer the automobile wheel; fifth, to provide within the hub a pivotally mounted bearing ring or support having ball bearings adapted to bear on the inner side of the hub. I attain these and other objects by the mechanism illustrated in the accompanying drawing, in which—

Figure 1 is a view from the inner end of the hub, and showing parts of my invention; Fig. 2 is a longitudinal section through the hub, on the line V—V in Fig. 1, and showing my complete invention, the bearing ring being shown in section; Fig. 3 is a plan view of the rack and lever with cogs for steering the wheel; Fig. 4 is an end view of the roller bearings in which the shafts are journaled, and Fig. 5 is a plan view of the gear wheels and showing the radial convex cogs thereon, and the cogs on the inner ends of the shafts and which coöperate with the gear wheels to drive the wheel.

Similar numerals of reference refer to corresponding parts throughout the several views.

Referring to the drawings—the numeral 1, indicates an automobile wheel of the standard type and having my improvement mounted in the hub 2, thereof. An annular flange 3, is formed integral with the outer side of the hub at any suitable point thereon, and is adapted to form a support for the spokes 4, when the latter are properly assembled with the wheel. An annular L-shaped clamping ring 5, is demountably mounted on the outer side of the hub and inwardly of the flange 3, and is adapted to impinge upon the spokes 4, and coöperate with the flange 3, to hold the spokes in place. An annular rim 7, is mounted on the outer ends of the spokes 4, and a rubber tire 8, is mounted on the rim in the well known manner. The outer end of the hub is closed, as shown at 9, in Fig. 2, and a boss 10, is formed on its inner side. A stub shaft 11, is extended through the boss 10, and the end wall of the hub 2, and is rigidly secured therein, so that when the wheel turns the stub-shaft will turn therewith. A gear wheel 12, having radially extending convex cogs 13, is rigidly mounted on the inner end of the stub-shaft 11, and is adapted for imparting rotary motion to the wheel. A supporting frame 14, is provided with an inner hingedly mounted portion 15, having a roller bearing journal 16, rigidly mounted in its vertical side to receive the stub-shaft 11, and is rigidly mounted at its outer ends on the side of a housing, hereafter described. A collar 17, is mounted on the stub-shaft between the inner end of the roller bearing 16, and the outer end of the gear wheel 12, to hold the latter in place. The outer portion of the supporting frame 14, is connected with the inner portion thereof by pivoted hinges 18, which are located in vertical line with the inner face of the gear wheel 12, and its outer ends are rigidly secured on the housing 19, in which a drive shaft 20, revolves, being turned by power imparting and power transmitting means, not shown. The drive shaft is journaled in a roller bearing 21. Cogs 22, are formed on the vertical face of the inner ends of the shafts and are adapted to engage each other and coöperate with the convex cogs on the gear wheels on the inner ends of the shafts to receive and transmit power. The shaft 20, is projected within the hub 2, and a gear wheel 23, having radially extending convex cogs 24, is mounted on the inner end thereof and in engagement with the gear wheel 12. A collar 25, is mounted on the shaft 20, between the gear wheel 23, and the inner end of the roller bearing 21, to hold the gear wheels in operative position. A bearing frame 26, having its upper and lower end portions curved concentrically with the hub, is pivoted on the lower side of the supporting frame, inwardly adjacent the inner end of the hub; the upper end of the bearing frame may be pivoted, also, on the upper end of the supporting frame, in which case, the pivot would be extended through the lever, hereafter described, and serve to pivot the same, in place of the pivot pin of the hinge 18, as shown in Fig. 2. Ball bearings 27, are mounted on the upper and lower portions of the bearing frame 26, and are adapted to bear on the inner surface of the hub. A rack 28, is mounted on the upper side of the swinging portion of the supporting frame 14, and a steering lever 29, having cogs 30, on its inner end in engagement with the rack, is pivotally mounted on the immovable portion of the supporting frame, by the pivot pin 31, of the hinge 18.

The provision of the rack 28, and the cogs 30, on the inner end of the lever 29, is for the purpose of permitting the adjustment of the lever to the hinged portion of the supporting frame at different angles, so that the lever may be adjusted to any desired angle to the steering rigging, which is disposed parallel with the front axle, but at various distances therefrom. The angular disposition of the lever is dependent upon the point of engagement of the rack by its cogs.

To operate my invention, when the drive shaft 20, is turned by a power, not shown, the gear wheel 23, turns therewith, and the latter turns the gear wheel 12, and the latter being rigidly connected with the end wall 9, of the hub, by the rigid shaft 11, the hub is thereby impelled to turn with the gear 12, and turn around about the mechanism described. If it is desired to steer the wheel from a straight line, the steering lever 29, is turned by the steering rigging, not shown, when the cogs 30, on the lever will engage the rack 28, and the hinged portion of the supporting frame will respond to the pressure and carry the wheel with it. When the hinged portion turns the wheel is thereby steered, and at the same time the gear wheels are operating at an angle to each other and propelling the wheel. When the wheel is in straight alinement the cogs 22, on the inner ends of the shafts are in engagement and coöperating with the gear wheels to drive the wheel. When the wheel is running in a straight line the bearing frame 26, is substantially parallel with the inner end of the hub, but when the wheel is steered the pressure of the hub on the ball bearings 27, operates to turn the bearing frame on its pivot, so that the bearing ring is substantially in the same relative position at all times. It is understood that ball bearings may be mounted on the sides of the bearing frame to take care of horizontal shock.

The advantage of the construction described, is the provision for housing the driving and steering mechanism within the hub of the wheel for driving front wheels of automobiles.

Having fully described my invention, what I claim is—

1. In a front wheel drive for automobiles, the combination, of a cup-shaped hub having within a stub-shaft fixed to its closed end, a gear wheel mounted on the inner end of said stub-shaft and having radially extending convex cogs, a drive shaft projected within said hub, a gear wheel mounted on the inner end of said drive shaft and having radially extending convex cogs engaged by the cogs on the gear wheel on said stub-shaft, a supporting frame having a rigid portion supporting said drive shaft and a hingedly mounted portion supporting said stub-shaft, and a bearing frame carrying ball bearings impinging on the inner side of said hub.

2. In a front wheel drive for automobiles, the combination, of a cup-shaped hub having within a stub-shaft fixed to its closed end, said stub-shaft having cogs on the vertical face of its inner end, a gear wheel mounted on the inner end of said stub shaft and having radially extending convex cogs, a drive shaft projected within said hub and having cogs on the vertical face of its inner end engaged by the cogs on the vertical face of the inner end of said stub-shaft, a gear wheel mounted on the inner end of said drive shaft and having radially extending convex cogs engaged by the cogs on the gear wheel on said stub-shaft, a supporting frame having a rigid portion supporting said drive shaft and a hingedly mounted portion supporting said stub shaft, and a bearing frame pivotally mounted on the rigid portion of said supporting frame and provided with ball bearings impinging on the inner side of said hub.

3. In a front wheel drive for automobiles, the combination, of a cup-shaped hub having within a stub-shaft fixed to its closed end, a gear wheel mounted on the inner end of said stub-shaft and having radially extending convex cogs, a drive shaft projected within said hub, a gear wheel mounted on the inner end of said drive shaft and having radially extending convex cogs engaged by the cogs on the wheel on said stub-shaft, a supporting frame having a rigid portion supporting said drive shaft and a hingedly mounted portion supporting said stub-shaft, a rack mounted on the hinged portion of said supporting frame, and a pivotally mounted lever having cogs engaged by said rack and adapted to steer the automobile wheel.

4. In a front wheel drive for automobiles, the combination, of a cup-shaped hub having within a stub-shaft fixed to its closed end, said stub-shaft having cogs on the vertical face of its inner end, a gear wheel mounted on the inner end of said stub-shaft and having radially extending convex cogs, a drive shaft projected within said hub and having cogs on the vertical face of its inner end engaged by the cogs on the vertical face of the inner end of said stub-shaft, a gear wheel mounted on the inner end of said drive shaft and having radially extending convex cogs engaged by the cogs on the gear wheel on said stub-shaft, a supporting frame having a rigid portion supporting said drive shaft and a hingedly mounted portion supporting said stub-shaft, a rack mounted on the hinged portion of said supporting frame, and a pivotally mounted lever having cogs engaged by said rack and adapted to steer the automobile wheel.

5. In a front wheel drive for automobiles, the combination, of a cup-shaped hub having within a stub-shaft fixed to its closed end, said stub shaft having cogs on the vertical face of its inner end, a gear wheel mounted on the inner end of said stub-shaft and having radially extending convex cogs, a drive shaft projected within said hub and having cogs on the vertical face of its inner end engaged by the cogs on the vertical face of the inner end of said stub-shaft, a gear wheel mounted on the inner end of said drive shaft and having radially extending convex cogs engaged by the cogs on the gear wheel on said stub-shaft, a supporting frame having a rigid portion supporting said drive shaft and a hingedly mounted portion supporting said stub-shaft, a bearing frame pivotally mounted on said supporting frame and having ball bearings impinging on the inner side of said hub, a rack mounted on the hingedly mounted portion of said supporting frame, and a pivotally mounted lever having cogs engaged by said rack and adapted to steer the automobile wheel.

6. In a front wheel drive for automobiles, the combination, of a cup-shaped hub having within a stub-shaft fixed to its closed end, a gear wheel mounted on the inner end of said stub shaft and having radially extending convex cogs, a drive shaft projected within said hub, a gear wheel mounted on the inner end of said drive shaft and having radially extending convex cogs engaged by the cogs on the gear wheel on said stub-shaft, a supporting frame having a rigid portion supporting said drive shaft and a hingedly mounted portion supporting said stub-shaft, a bearing frame pivotally mounted on said supporting frame and having ball bearings impinging on the inner side of said hub, a rack mounted on the hingedly mounted portion of said supporting frame, and a pivotally mounted lever having cogs engaged by said rack and adapted to steer the automobile wheel.

ELI NOEL.

Witnesses:
 ELVA GILLHAM,
 T. DAHLSTROM.